(12) United States Patent
Yokota et al.

(10) Patent No.: US 8,094,811 B2
(45) Date of Patent: Jan. 10, 2012

(54) DATA ENCRYPTION DEVICE AND DATA ENCRYPTION METHOD

(75) Inventors: Kaoru Yokota, Hyogo (JP); Masao Nonaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1093 days.

(21) Appl. No.: 11/597,915

(22) PCT Filed: Feb. 10, 2006

(86) PCT No.: PCT/JP2006/302364
§ 371 (c)(1),
(2), (4) Date: Nov. 29, 2006

(87) PCT Pub. No.: WO2006/112114
PCT Pub. Date: Oct. 26, 2006

(65) Prior Publication Data
US 2008/0285743 A1    Nov. 20, 2008

(30) Foreign Application Priority Data

Mar. 31, 2005 (JP) .................................. 2005-102157

(51) Int. Cl.
*H04L 9/28* (2006.01)
(52) U.S. Cl. ............ 380/28; 380/44; 380/277; 380/252; 713/189; 713/300; 708/255
(58) Field of Classification Search .................... 380/28, 380/277; 713/300
See application file for complete search history.

(56) References Cited

U.S. PATENT DOCUMENTS

| | | | |
|---|---|---|---|
| 6,263,081 B1 * | 7/2001 | Miyaji et al. ..................... | 380/28 |
| 6,295,606 B1 | 9/2001 | Messerges et al. | |
| 6,714,648 B2 * | 3/2004 | Miyazaki et al. ................ | 380/30 |
| 6,963,976 B1 * | 11/2005 | Jutla .............................. | 713/181 |
| 6,970,561 B1 * | 11/2005 | Obana .............................. | 380/28 |
| 7,068,786 B1 * | 6/2006 | Graunke et al. ................ | 380/44 |
| 7,142,670 B2 * | 11/2006 | Chari et al. ..................... | 380/28 |

(Continued)

FOREIGN PATENT DOCUMENTS

EP    1 267 514    12/2002

(Continued)

OTHER PUBLICATIONS

Bucci M, A countermeasure against differential power analysis based on random delay insertion, May 26, 2005, IEEE, vol. 4.*

(Continued)

*Primary Examiner* — Nathan Flynn
*Assistant Examiner* — Viral Lakhia
(74) *Attorney, Agent, or Firm* — Wenderoth, Lind & Ponack, L.L.P.

(57) ABSTRACT

A data encryption device that is capable of stopping power analysis attacks and reducing instances of speed drops and memory amount increases in encryption processing more effectively than in the past; the data encryption device performs a predetermined encryption, based on a key, on a plain text, and includes a random number generation unit (410a) which generates one core random number per round, concatenates a predetermined amount of plural core random numbers and generates a first random number; an exclusive OR unit which data-merges the plain text with the first random number and generates intermediate data (410b); and a data randomizing unit (410f, 410k) which performs a data randomizing process on the intermediate data, the data randomizing process being based on the first random number, a second random number and the key.

7 Claims, 16 Drawing Sheets

U.S. PATENT DOCUMENTS

| | | | |
|---|---|---|---|
| 7,158,638 B2 | 1/2007 | Okada et al. | |
| 7,159,115 B2 * | 1/2007 | Fujisaki et al. | 713/171 |
| 7,454,016 B2 * | 11/2008 | Tsunoo | 380/29 |
| 7,488,514 B2 * | 2/2009 | Basceri et al. | 427/255.32 |
| 7,496,616 B2 * | 2/2009 | Chari et al. | 708/250 |
| 7,613,296 B2 * | 11/2009 | Choi et al. | 380/37 |
| 7,680,272 B2 * | 3/2010 | Yoon et al. | 380/30 |
| 7,831,833 B2 * | 11/2010 | Gaylor | 713/176 |
| 7,949,883 B2 * | 5/2011 | Shu et al. | 713/190 |
| 8,050,402 B2 * | 11/2011 | Golic | 380/28 |
| 2001/0033656 A1 * | 10/2001 | Gligor et al. | 380/28 |
| 2003/0048903 A1 * | 3/2003 | Ito et al. | 380/263 |
| 2003/0108195 A1 | 6/2003 | Okada et al. | |
| 2003/0223580 A1 * | 12/2003 | Snell | 380/28 |
| 2004/0062391 A1 * | 4/2004 | Tsunoo | 380/42 |
| 2004/0172556 A1 * | 9/2004 | Nagao | 713/201 |
| 2005/0036607 A1 * | 2/2005 | Wan et al. | 380/28 |
| 2005/0055596 A1 * | 3/2005 | Abe et al. | 713/500 |
| 2005/0108308 A1 * | 5/2005 | Yasuda et al. | 708/250 |
| 2005/0259814 A1 * | 11/2005 | Gebotys | 380/28 |
| 2006/0050887 A1 * | 3/2006 | Chen | 380/270 |
| 2006/0153372 A1 * | 7/2006 | Kim et al. | 380/30 |
| 2006/0280296 A1 * | 12/2006 | Vasyltsov et al. | 380/28 |
| 2007/0177720 A1 * | 8/2007 | Bevan et al. | 380/28 |
| 2007/0230694 A1 * | 10/2007 | Rose et al. | 380/46 |

FOREIGN PATENT DOCUMENTS

| | | |
|---|---|---|
| JP | 2000-502822 | 3/2000 |
| JP | 2002-366029 | 12/2002 |
| JP | 2003-015522 | 1/2003 |
| JP | 2005-086670 | 3/2005 |
| JP | 2005-134478 | 5/2005 |
| WO | 98/07251 | 2/1998 |

OTHER PUBLICATIONS

Katz, O, Robust Random Number Generator based on a differential current—mode chaos, Mar. 2008 IEEE, 16, Issue:12, pp. 1-10.*

"Federal Information Processing Standards Publication 197," Advanced Encryption Standard (AES), Nov. 26, 2001, pp. i-iv & 1-47.

* cited by examiner

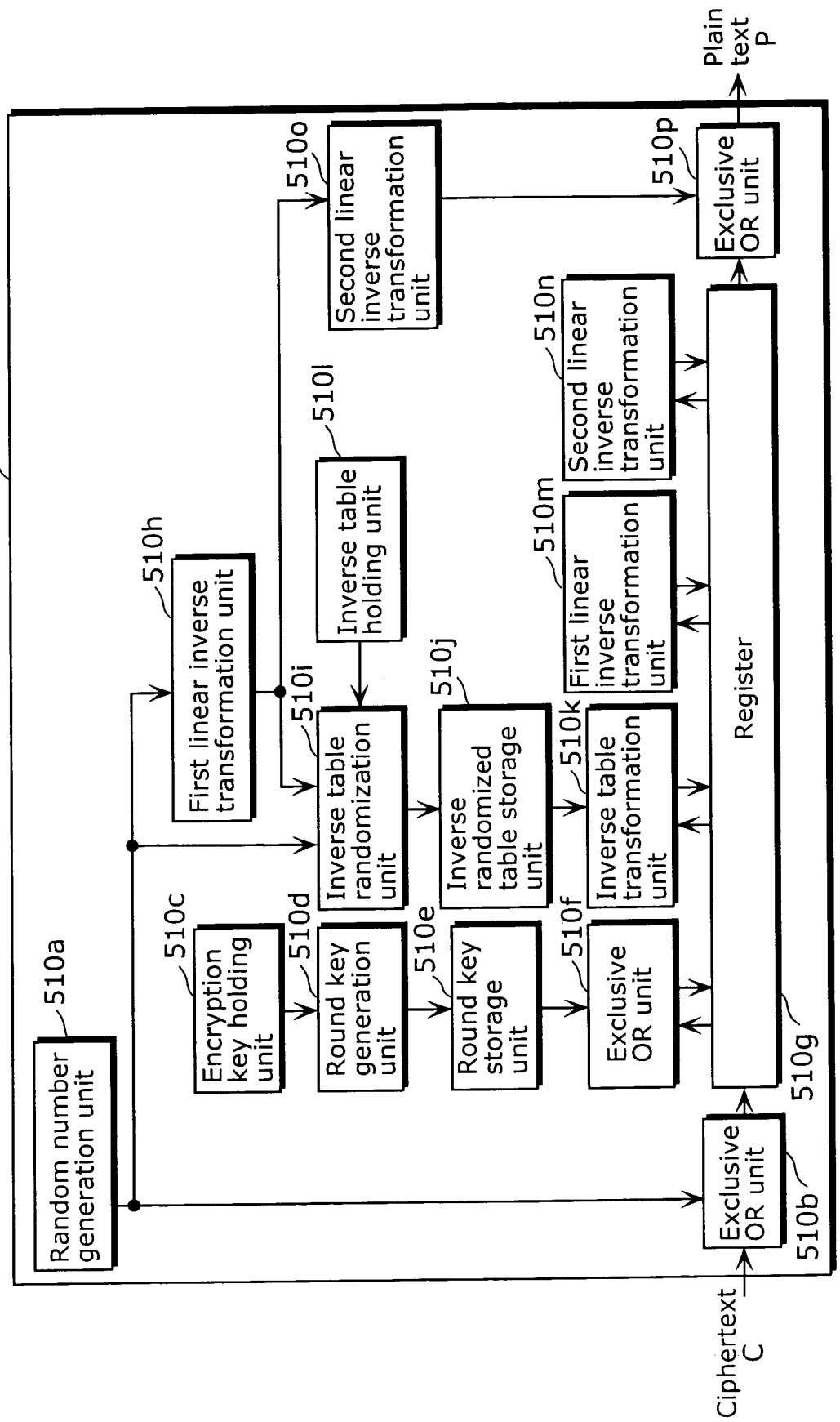

DATA ENCRYPTION DEVICE AND DATA ENCRYPTION METHOD

TECHNICAL FIELD

The present invention relates to a data encryption device, and particularly to a data encryption device which is safe from a method of attack which analyzes an encryption key embedded in an encryption module by measuring the power consumption when an encryption process is executed.

BACKGROUND ART

In recent years, various types of cracking methods have been devised which analyze an encryption key using secondary information that is generated when an encryption module provided in hardware or software performs encryption. For example, in a cracking method known as a timing attack, the analysis of an encryption key is performed making use of the fact that the time required by the encryption module for encryption is different, although only slightly, depending on the value of the encryption key used in the encryption. More specifically, in a timing attack, the encryption key is cracked by using secondary information which indicates the processing time during encryption. Among such cracking methods, various cracking methods such as "Simple Power Analysis" and "Differential Power Analysis" have been devised as methods for cracking the encryption key using the power consumption during encryption as secondary information. It is reported that, in recent years, partly due to the low cost at which high-performance measurement devices have become available, it is possible for such cracking methods to analyze actual goods that are provided with encryption such as an IC (Integrated Circuit) card. In addition, numerous methods have been devised, such as cracking methods that use the intensity of electromagnetic waves emitted from an encryption module during encryption as secondary information. In the following description, cracking methods, which analyze an encryption key using the power consumption of an encryption module during encryption as a lead, shall be referred to generally as "power analysis attacks". Although the present invention below will be described using the power analysis attack as an example, the present invention can also be described in the same manner for other cracking methods which make use of secondary information. In other words, the present invention can be applied not only to power analysis attacks, but also to cracking methods which perform key extrapolation using secondary information generated from an encryption module during encryption.

An overview of the power analysis attack shall be described. Below, the present invention shall be described based on an example in which a power analysis attack is applied to AES (Advanced Encryption Standard) cryptography (refer to patent document 1 for details of AES cryptography). FIG. 1 is a block diagram for explaining an overview of AES cryptography process. Although AES cryptography supports three types of key sizes, namely the 128-bit, 192-bit, and 256-bit sizes, the present invention is described below for a key size of 128-bits. Furthermore, although in AES cryptography, 128-bit×11 key pieces, known as round keys K0, K1, . . . K10 are generated based on the 128-bit round key; here, the present invention is described under the assumption that the round keys are already generated. FIG. 1 does not show the round key generation process.

(AES Cryptography Process Overview)

An overview of the encryption in AES cryptography shall be described.

The AES encryption process performs an exclusive OR operation 10a, a table transformation process (S) 10b and a linear transformation (L1) 10c bit-wise with the round key K0 on the 128-bit plain text P. Next, the same process series above is performed using the round key K1 (11a through 11c). Further, the same process series is performed in sequence using the round keys K2, K3, . . . K9. However, for the process series using the round key K9, a linear transformation L2 is performed instead of the linear transformation L1 (19c). Finally, a bitwise exclusive OR operation is performed with the round key K10(19d), and the resulting value is a ciphertext C.

(Table Transformation S (10b))

The processes in the table transformation 10b are described below. Note that the table transformations 11b, 12b, . . . 19b are identical to the table transformation 10b.

FIG. 2 is a block diagram which shows the processes of the table transformation 10b. The 128-bit inputted data is divided from the most significant bit into 8-bit units, resulting in 16 8-bit pieces. Subsequently, a table transformation process is performed for each 8-bit data piece by using the transformation table Tab (100a through 100p). Thus the transformation table Tab is a table which shows the relationship between inputted 8-bit units and outputted 8-bit units, and is expressed more specifically by an array Tab[256] of 256 8-bit elements and when inputted 8 bit units are X, the output value Y after the table transformation is obtained with Y=Tab[X].

More specifically, the transformation table used in AES encryption is a table made up of Tab[256]={63h, 7Ch, 77h, 7Bh . . . BBh, 16h}. Here, the "h" in 63h indicates that the "63" is in hexadecimal notation. Here, the output of a table transformation with respect to an input 03h is Tab[2]=77h and the output of the table transformation with respect to the input FEh (decimal number, 254) becomes Tab[254]=BBh. In this way, table transformation processes are performed on each 8-bit data unit. Subsequently, each output result is concatenated in the same order in which the output results were divided, becomes 128-bit and the output data Y becomes 128-bit.

(Linear Transformation L1(10c))

The process for the linear transformation L1 (10c) is described below. Note that the linear transformation processes 11c, 12c, . . . 18c are the same processes as the linear transformation L1.

The linear transformation L1 performs a byte transposition called ShiftRow and a matrix transformation called Mix Column in the following order. First, the input data is divided into 8-bit units A0, A1, . . . A14 and A15. The Shift Row byte transposition re-aligns A0 through A15 and produces 128-bit data. More specifically, data is concatenated in the order from the most significant bit: A0, A5, A10, A15, A4, A9, A14, A3, A8, A13, A2, A7, A12, A1, A6, A11 into 128-bit data.

Subsequently, a MixColumn process is performed on the result of the ShiftRow process above. In other words, the results of the ShiftRow are again divided from the most significant bit into 8-bit units B0, B1, . . . B14 and B15. Next, a matrix operation is performed according to an equation 1 below, with X0=B0, X1=B4, X2=B8, X3=B12, calculating Y0, Y1, Y2, Y3 such that C0=Y0, C4=Y1, C8=Y2 and C12=Y3.

$$\begin{pmatrix} Y0 \\ Y1 \\ Y2 \\ Y3 \end{pmatrix} = \begin{pmatrix} 02h & 03h & 01h & 01h \\ 01h & 02h & 03h & 01h \\ 01h & 01h & 02h & 03h \\ 03h & 01h & 01h & 02h \end{pmatrix} \times \begin{pmatrix} X0 \\ X1 \\ X2 \\ X3 \end{pmatrix} \quad \text{[Equation 1]}$$

Here, the addition and multiplication used in the matrix algebra are operations performed on an extension field $GF(2^8)$. Also, "$2^8$" stands for 2 to the eighth power. Further, the above matrix algebra (the operation shown in equation 1) is performed with X0=B1, X1=B5, X2=B9, X3=B13, calculating Y0, Y1, Y2 and Y3 such that C1=Y0, C5=Y1, C9=Y2 and C13=Y3. In the same way, the matrix algebra (Equation 1) is performed with X0=B2, X1=B6, X2=B10 and X3=B14, calculating Y0, Y1, Y2 and Y3 such that C2=Y0, C6=Y1, C10=Y2 and C14=Y3. Subsequently, the matrix algebra is performed with X0=B3, X1=B7, X2=B11, X3=B15, calculating Y0, Y1, Y2, Y3 such that C3=Y0, C7=Y1, C11=Y2 and C15=Y3. C0, C1, C2, . . . C14 and C15 obtained above, i.e. the 128-bit data concatenated in sequence from the most significant bit, becomes the output data for the MixColumn process, i.e. the output data of the linear transformation L1.

(Linear Transformation L2 (19c))

The linear transformation L2 (19c) is a linear transformation in which the Mix Column process from the linear transformation L1 has been omitted. In other words, the output data is the result of performing a ShiftRow process alone on the input data for L2.

(Structure of Encryption Device 110)

Below, an example structure is described in which AES encryption is provided as an encryption device.

FIG. 3 is a block diagram which shows an example structure in which AES encryption is provided as an encryption device.

The encryption device 110 is a device which encrypts the plain text P and outputs the ciphertext C, and includes a register 110a, an encryption key storage unit 110b, a round key generation unit 110c, a round key storage unit 110d, an exclusive OR unit 110e, a table holding unit 110f, a table transformation unit 110g, a first linear transformation unit 110h and a second linear transformation unit 110i.

The register 110a is a storage device for storing intermediate data for the encryption process. The encryption key storage unit 110b is a storage unit for storing the encryption key. The round key generation unit 110c is a processing unit for reading out the encryption key from the encryption key storage unit 110b during the encryption process, generating the round keys K0 through K10 and storing the keys in the round key storage unit 110d. The exclusive OR unit 110e is a processing unit which reads out a round key needed from the round key storage unit 110d and performs an exclusive OR operation. The table holding unit 110f is a storage device for storing the transformation table made of 256 8-bit data pieces above as the Tab[256] array. The table transformation unit 110g is a processing unit which reads out the Tab[256] array from the table holding unit 110f and executes a table transformation process. The first linear transformation unit 110h and the second linear transformation unit 110i are processing units which execute the above linear transformation L1 and the linear transformation L2 processes respectively.

Next, the operations in the encryption device 110 are described. When the plain text P is inputted into the encryption device 110, the plain text P is temporarily stored in the register 110a. Next, the exclusive OR unit 110e reads out the data stored in the register 110a, performs an exclusive OR operation on the round key and overwrites and stores the operation result into the register 110a. Next, the table transformation unit 110g reads out data that is stored in the register 110a, performs a table transformation process, and overwrites and stores the transformation result into the register 110a. Subsequently, the first linear transformation unit 110h reads out the data stored in the register 110a, performs the linear transformation L1 process, and overwrites and stores the transformation result into the register 110a.

Below, the above processes are repeatedly performed according to the processing order for the AES encryption mentioned above. However, for the linear transformation process in the final repetition, the linear transformation L2 process is performed by the second linear transformation unit 110i, instead of the first linear transformation unit 110h, and further, the exclusive OR unit 110e performs an exclusive OR operation on the round key K10 and overwrites and stores the operation result into the register 110a. Subsequently, the encryption device 110 outputs the data stored in the register 110a as the ciphertext C.

(Power Analysis Attack Against the Encryption Device 110)

An outline of the power analysis attack against the encryption device 110 is described below. In the encryption device 110, the data (intermediate data) on which the AES encryption process is being performed is temporarily stored in the register 110a. More specifically, in FIG. 1, after all of the data passed from one block to another block is stored temporarily in the register 110a, processing is performed by the other block.

A power analysis attack focuses on the storing of intermediate data into the register in the encryption process as above. The power consumption level when data is stored in the register will depend on the content of the data stored. For example, the more bits with a value of "1" in the stored data, the greater the power consumed during storage. Also, when overwriting to the register, the greater the number of bits in the register that are inverted (for example, a "0" bit is written over a bit that is stored as a "1" bit), the greater the power consumed during storage. Using these guidelines, the amount of power consumed when storing bits in the register is measured and the data in the register is estimated. Subsequently, an encryption key used for encryption processing is ascertained from the data value estimated. For example, the exclusive OR unit 110e in FIG. 3 can analyze data after the exclusive OR unit 10a process in FIG. 1 is performed, by analyzing the amount of power consumed when the exclusive OR unit 110e in FIG. 3 stores the data in the register 110a. Here the data is D, and assuming that an analyst knows the value of the plain text P, the round key K0 can be found using K0=D(+)P. Here, "(+)" represents an exclusive OR for every bit. For AES encryption, the encryption key can be found by the analysis above since it is known that the round key K0 is identical to the encryption key.

As described above, it is clear that a intermediate value in the encryption process temporarily stored in the register is estimated from the amount of power consumed during encryption and the encryption key will be estimated there from.

(Counter-Measures for Power Analysis Attacks)

A method known as the masking method has been disclosed as a countermeasure for power analysis attacks (see for example, Patent Document 1). In the encryption device 110 shown in FIG. 3, a problem occurs when the intermediate value is analyzed since it is held during encryption temporarily in the register 110a. The masking method is characterized in that the intermediate value in the encryption process is randomized using random numbers before the intermediate value in the encryption process is stored in the register. Thus, even when the data in the register is estimated using power analysis, the actual intermediate value in the encryption process will not be found since the value in the register data are randomized by a random number. Accordingly, the value of the round key cannot be ascertained.

FIG. 4 and FIG. 5 are block diagrams which describe a processing sequence in which the masking method is applied to AES encryption. Before performing the encryption process, 128-bit random numbers R0 through R10 are generated. Subsequently, exclusive OR operations 20a, 20c, 20e, 21b, . . . 29b, 29d and 29h, which utilize the random numbers generated, are added to the original AES encryption as shown in FIG. 4. Here, the exclusive OR operations 21b, . . . 29b are exclusive OR operations on the result of the linear transformation L1 being applied to the random numbers, and the exclusive OR operation 29h is an exclusive OR operation on the result of the linear transformation L2 being applied to the random numbers. Here, the intermediate value T in the encryption process is effected by the random number R0 and randomized by the exclusive OR operation 20a. However, afterwards, the effect is cancelled out when the exclusive OR operation 20c performs an exclusive OR operation on the random number R0. In the same way, since randomizing effects of the random numbers R1, R2, . . . R10 are cancelled out, the ciphertext C which is ultimately obtained is identical to the ciphertext obtained by the original AES encryption process shown in FIG. 1.

When actually implemented as an encryption device, encryption processing is implemented not with the structure in FIG. 4 but with the structure in FIG. 5. The difference between FIG. 4 and FIG. 5 is that the process series in FIG. 4: "Exclusive OR operation on a random number→Table transformation→Exclusive OR operation on a random number" has been replaced with "Table transformation by a randomized transformation table". Below, this point will be explained.

FIG. 6 is a block diagram for describing the inner structure of the random table transformation 30c in FIG. 5. Note that the random table transformations 31b, 32b . . . 39b are the same as the random table transformation 30c, except for the random numbers used. The 128-bit input data X is divided into 8-bits from the most significant bit, into x0, x1, . . . x15. Also, the random numbers R0 and R1 are divided into 8-bit units from the most significant bit and become respectively R0a, R0b, . . . R0p and R1a, R1b, . . . R1p. First, exclusive OR operations are performed with R0a, R0b, . . . R0p on x0, x1, . . . x15. Next, table transformations using the transformation table Tab in AES encryption are performed respectively on the results (each 8-bit piece). Subsequently, exclusive OR operations with R1a, R1b, . . . R1p are performed on each table transformation result respectively and the results are y0, y1, . . . y15 respectively. y0, y1, . . . y15, i.e. the concatenated 128-bit data in order from the most significant bit, is outputted as Y.

Thus, when the random number R0 (i.e. R0a through R0p) and the random number R1 (i.e. R1a through R1p) are set, the relationship between x0 and y0, the relationship between x1 and y0 and so on up to the relationship between x15 and y15 can be expressed as a transformation table made of 256 pieces of 8-bit data. In other words, the process in FIG. 6 is a process made up of the 16 types of transformation tables Tab0a, Tab0b, . . . Tab0p as well as the table transformation processes 303a, 303b, . . . 303p.

In summary, the processing sequence in AES encryption for performing counter-measures against masking method cracking is shown in FIG. 5. The processing sequence becomes the following.

(1) Generate 11 128-bit random numbers R0, R1, . . . R10.

(2) Compose a random table transformation Sm0(30c) based on random numbers R0 and R1. More specifically, as shown in FIG. 7, create 16 types of transformation tables that are each made up of 256 pieces of 8-bit data. In the same way, compose the random table transformations Sm1 through Sm9 using the random numbers R1 and R2, R2 and R3, . . . R9 and R10. The specific composition method is the same as Sm0.

(3) Perform an encryption process according to FIG. 5. The present invention differs from the original AES encryption process in the addition of an exclusive OR operation 30a with the random number R0; a linear transformation L2 (39e) of the random number R10; and the addition of an exclusive OR operation 39f on the linear transformation result, and also in that the table transformation processes 30c, 31b, . . . 39b use the randomizing transformation tables created using the random numbers R0 through R10 instead of the original transformation table Tab.

[Non-Patent Document 1] Federal Information Processing Standards Publication 197, "Specification for the ADVANCED ENCRYPTION STANDARD (AES)", Nov. 26, 2001

[Patent Document 1] U.S. Pat. No. 6,295,606 Specification

DISCLOSURE OF INVENTION

Problems that Invention is to Solve

However, in the prior art, there is the problem that the processing speed of the encryption device drops remarkably with the increase in the amount of encryption processes brought on by power analysis attack countermeasures. In other words, the randomizing transformation tables (tables with 256 8-bit elements) that must be generated, based on the random numbers generated, and 16 tables are included for each of Sm0, Sm1, . . . Sm9 (for example, the sixteen types for Sm0: Tab0a, Tab0b, . . . Tab0p). In other words, it is necessary to draw up a total of 16×10=160 types of randomizing transformation tables when encryption is performed once.

Also, the random numbers used in generating the randomizing transformation tables must differ for each encryption process and the table creation process above must be executed each time encryption processing is performed. Accordingly, there is the problem that the speed of encryption processing drops remarkably due to processes added for power analysis countermeasures.

Also, since the memory used to store the 160 types of randomizing transformation tables above must be inside the encryption module, there is also the problem that the amount of memory will rise remarkably.

The present invention is conceived in order to solve the problems above and can stop power analysis attacks; the present invention has an objective of providing a data encryption device which can reduce drops in encryption processing speed as well as increases in the amount of memory more effectively than a conventional data encryption device.

Means to Solve the Problems

In order to solve the conventional problems, the data encryption device in the present invention performs a predetermined encryption, based on a key, on a plain text and generates a ciphertext, the data encryption device includes: a random number generation unit which generates one core random number per round, and generates a first random number by concatenating a predetermined amount of plural core random numbers; a plain text data-merging unit which data-merges the plain text with the first random number and which generates intermediate data; and a data randomizing unit which performs a data randomizing process on the intermediate data per round, the data randomizing process being based on the first random number, the second random number and the key.

With this configuration, the first random number is a repetition of the core random number. Because of this, when for example the amount of core numbers is 16 and a data randomizing process is performed, it is possible to realize a randomizing transformation table, which normally needs 16 core random numbers, with only one core random number. Thus speed drops in encryption processing can be reduced and the amount of memory necessary for encryption processing can be reduced. For example, the data randomizing unit may include: a transformation table storage unit which stores a transformation table for transforming data pieces per round, generated by dividing the plain text by the predetermined amount; a table modification unit which performs a table transformation on the transformation table per round, the table transformation modifying the transformation table based on the first random number and the second random number, in order to generate one modified transformation table; a modified transformation table storage unit which stores the modified transformation table; and a data transformation unit which performs a data transformation process per round on each piece of the intermediate data, which is the intermediate data divided by the predetermined amount, based on the key and the modified transformation table stored in the modified transformation table.

The data encryption device may further include a random number transformation unit which performs a predetermined random number transformation on the first random number and generates the second random number; the data randomizing unit may further include a linear transformation unit which performs a predetermined linear transformation on the intermediate data and outputs the result; and the random number transformation unit may perform an inverse transformation of the linear transformation as the random number transformation.

Further, the predetermined encryption process may be the AES (Advanced Encryption Standard) encryption process; the linear transformation unit may be configured with an InvMixColumn process and an InvShiftRow process for AES encryption processing; and the random number transformation unit may output the first random number as the second random number.

Further, the core random numbers may have the same values within all of the rounds.

By making the core random numbers have the same value for every round, the modified transformation tables used by the data encryption device may be reduced to one modified transformation table. Thus speed drops in encryption processing can be reduced and the amount of memory necessary for encryption processing can be reduced.

Note that the present invention can not only be realized as a data encryption device with the above characteristic units, and may be realized as a data encryption method with steps in place of the characteristic units included in the data encryption device and as a program on a computer which is made to execute the characteristic steps included in the data encryption method. Subsequently, it goes without saying that this sort of program can be distributed through a storage medium such as a CD-ROM (Compact Disc-Read Only Memory) and a communications network such as the Internet.

Effects of the Invention

According to the present invention, power analysis attacks can be stopped and a data encryption device can be provided which is capable of reducing drops in encryption processing speed and increases in memory size more effectively than in the past.

According to the encryption device in the present invention, random numbers for randomizing the intermediate data in the encryption process and the transformation table as well as each of the random numbers on which exclusive OR operations are performed before and after each table transformation process are set to the same value according to a fixed format. Analysis methods, such as power analysis attacks which use secondary information generated in the encryption module during encryption, can be stopped, and thus there is the effect of reducing speed decreases in encryption processing speed and increases in memory size, which are brought about by countermeasures for stopping analysis methods, more effectively than in the past.

BRIEF DESCRIPTION OF DRAWINGS

FIG. 16 is a block diagram which shows the structure of a decryption device 510 according to the embodiment of the present invention.

NUMERICAL REFERENCES

Figure 1:
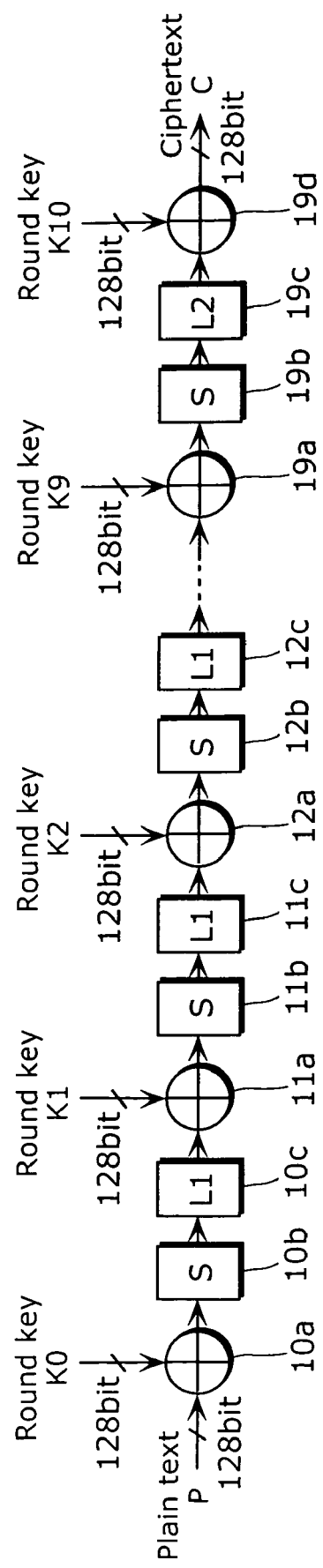
FIG. 1 is a block diagram which shows a processing sequence in the AES encryption.
Figure 2:
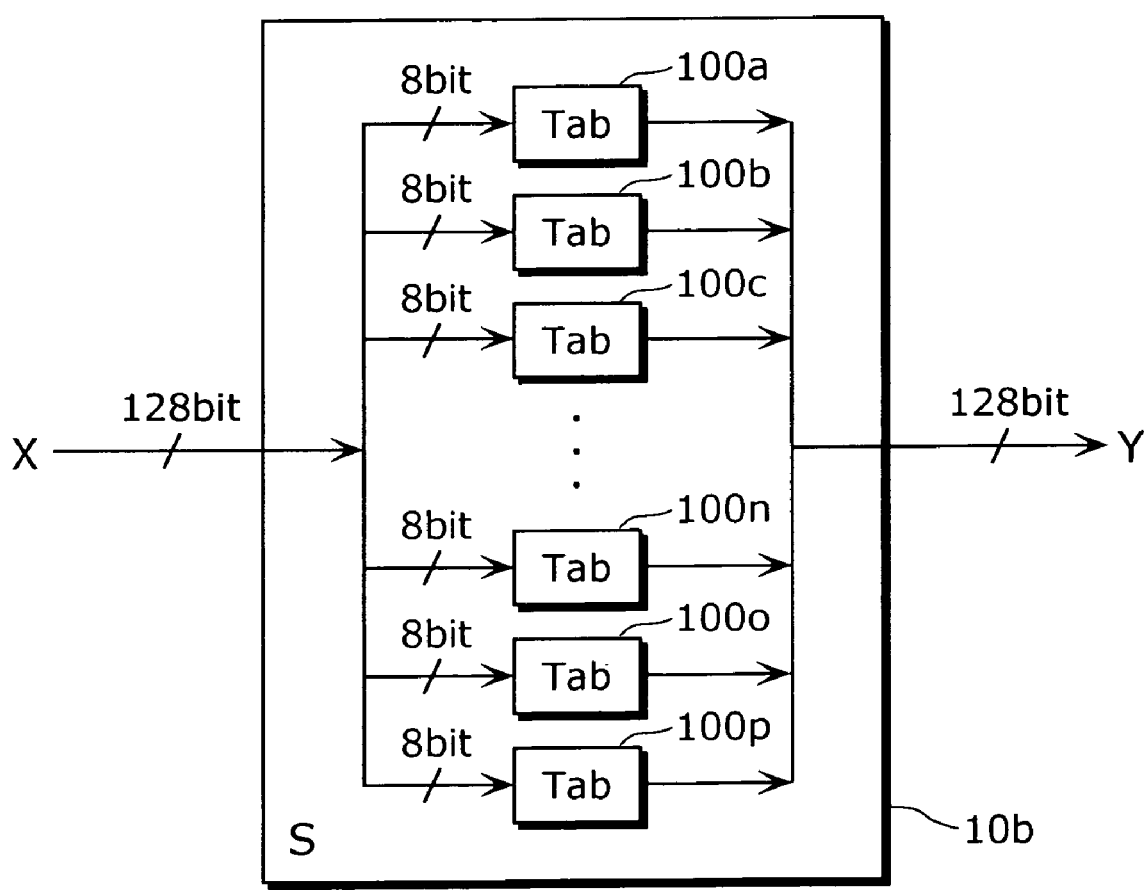
FIG. 2 is a block diagram which shows the structure of a table transformation process 10b in AES encryption.
Figure 3:
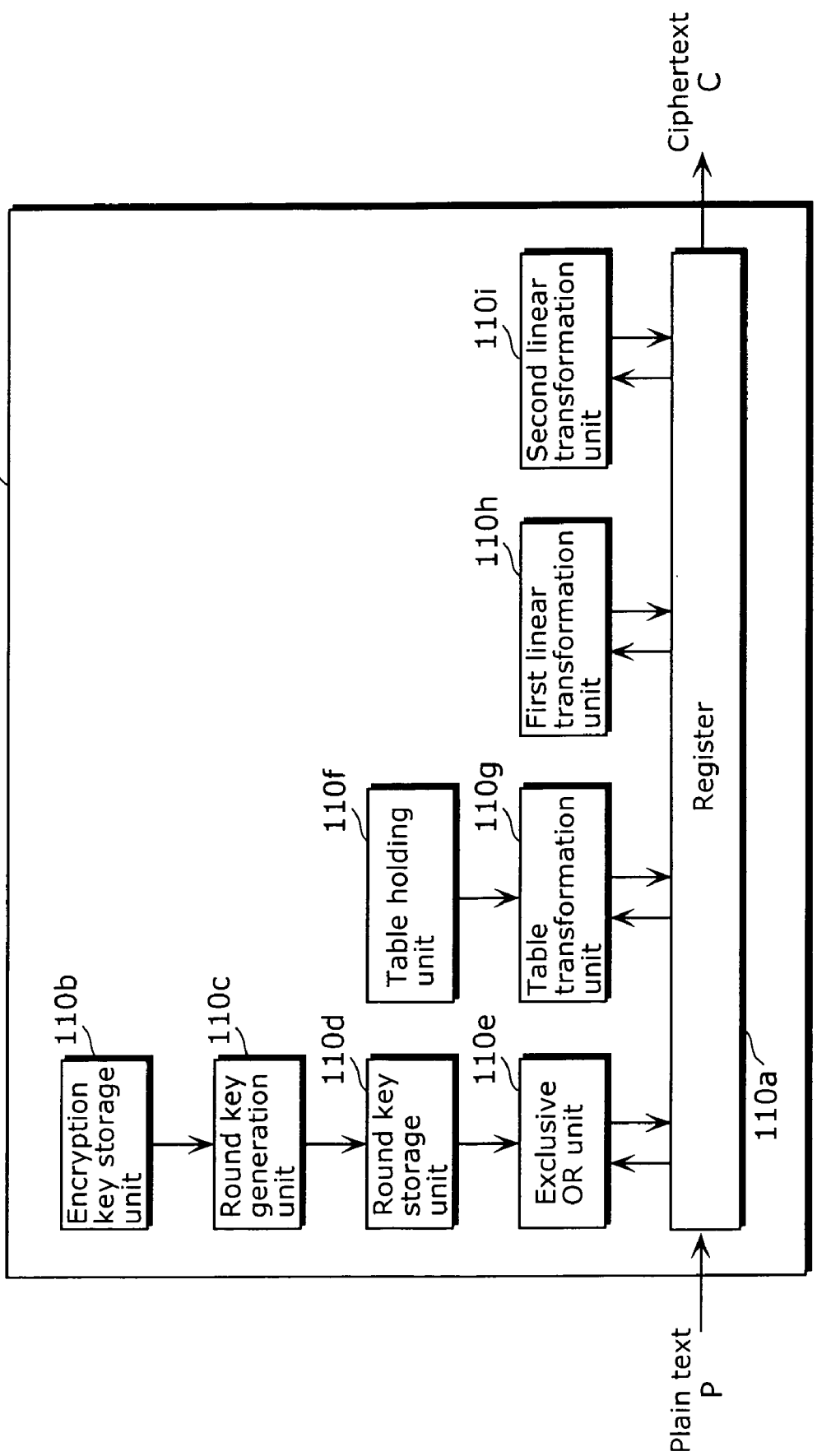
FIG. 3 is a block diagram which shows the structure of the encryption device 110 in AES encryption.
Figure 4:
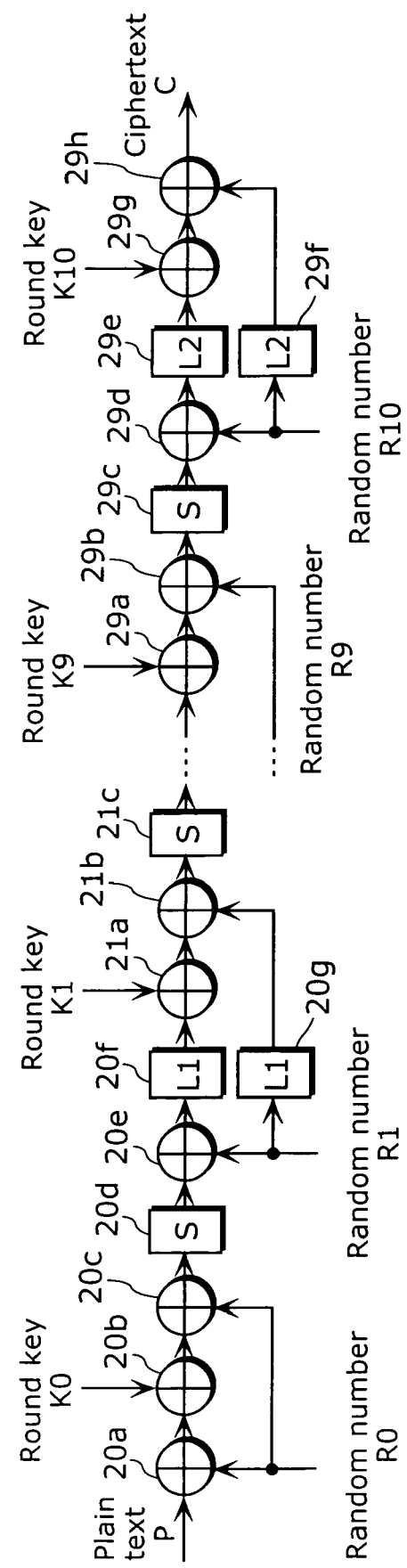
FIG. 4 is a block diagram which shows a processing sequence for AES encryption according to the background art.
Figure 5:
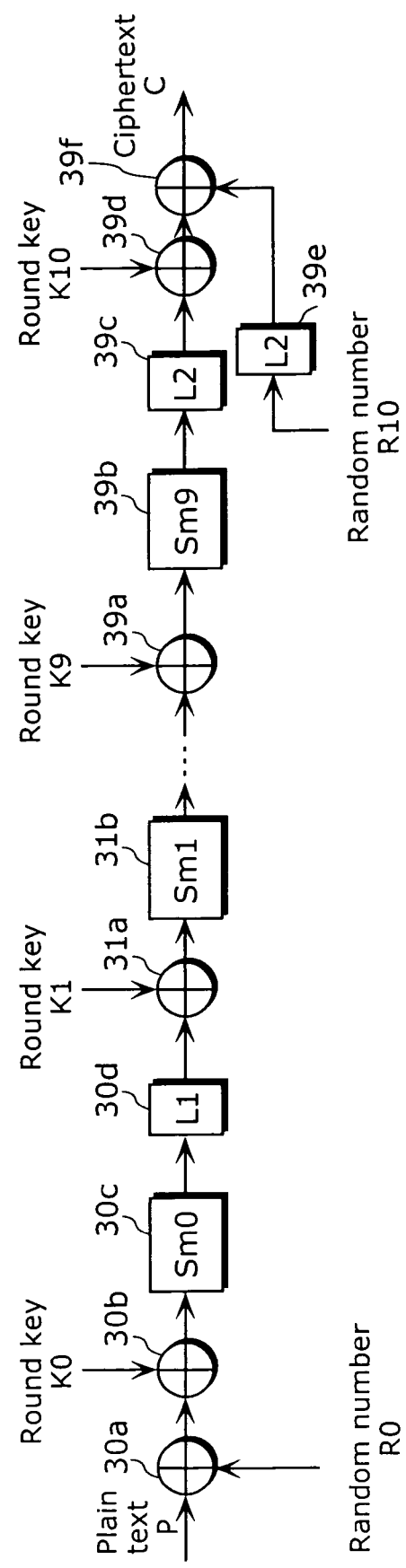
FIG. 5 is a block diagram which shows a processing sequence for AES encryption according to the background art.

410 Encryption device
410a Random number generation unit
410b Exclusive OR unit
410c Encryption key holding unit
410d Round key generation unit
410e Round key storage unit
410f Exclusive OR unit
410g Register
410h First linear inverse transformation unit
410i Table randomizing unit
410j Randomizing table storage unit
410k Table transformation unit
410l Table holding unit
401m First linear transformation unit
401n Second linear transformation unit
401o Second linear transformation unit
410p Exclusive OR unit
510 Decryption device
510a Random number generation unit
510b Exclusive OR unit
510c Encryption key holding unit
510d Round key generation unit
510e Round key storage unit
510f Exclusive OR unit
510g Register
510h First linear inverse transformation unit
510i Inverse table randomizing unit
510j Inverse randomized table storage unit
510k Inverse table transformation unit
501l Inverse table holding unit
501m First linear inverse transformation unit
501n Second linear inverse transformation unit
501o Second linear transformation unit
510p Exclusive OR unit

BEST MODE FOR CARRYING OUT THE INVENTION

Below, an embodiment of the present invention is described with reference to figures.

(Overview of a Processing Sequence in AES Encryption for Stopping Power Analysis Attacks)

Figure 8:
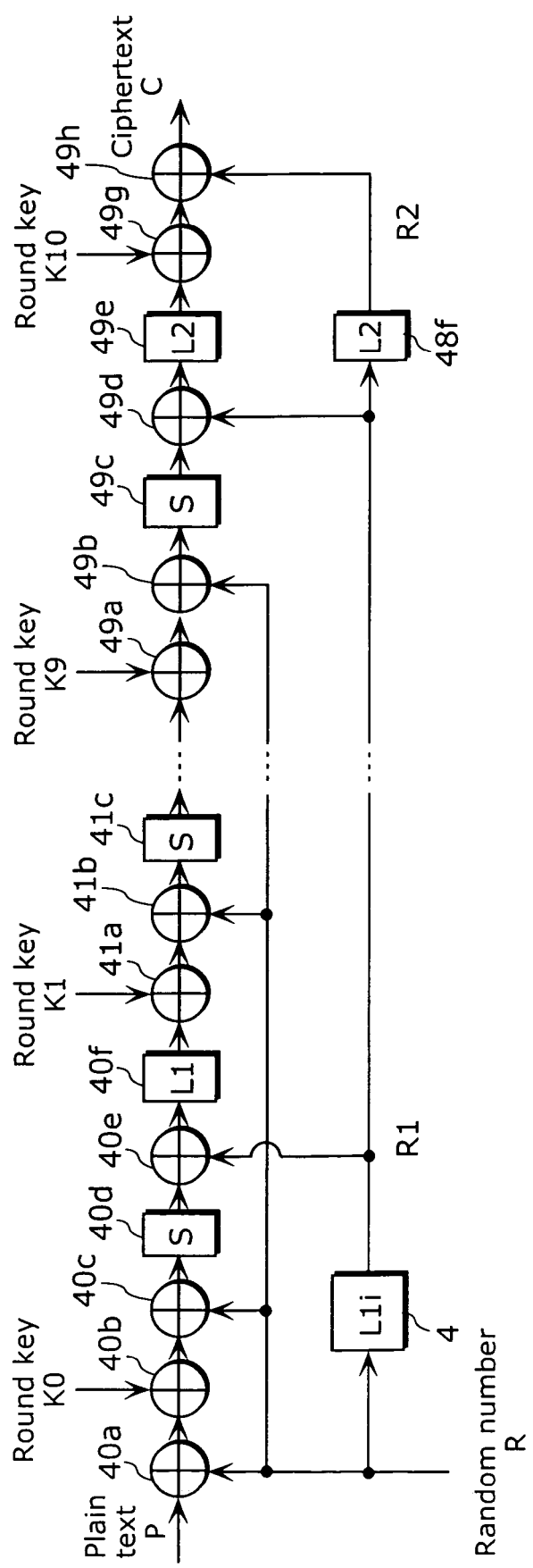
FIG. 8 is a block diagram which shows the AES encryption processing sequence according to the embodiment of the present invention.
Figure 9:
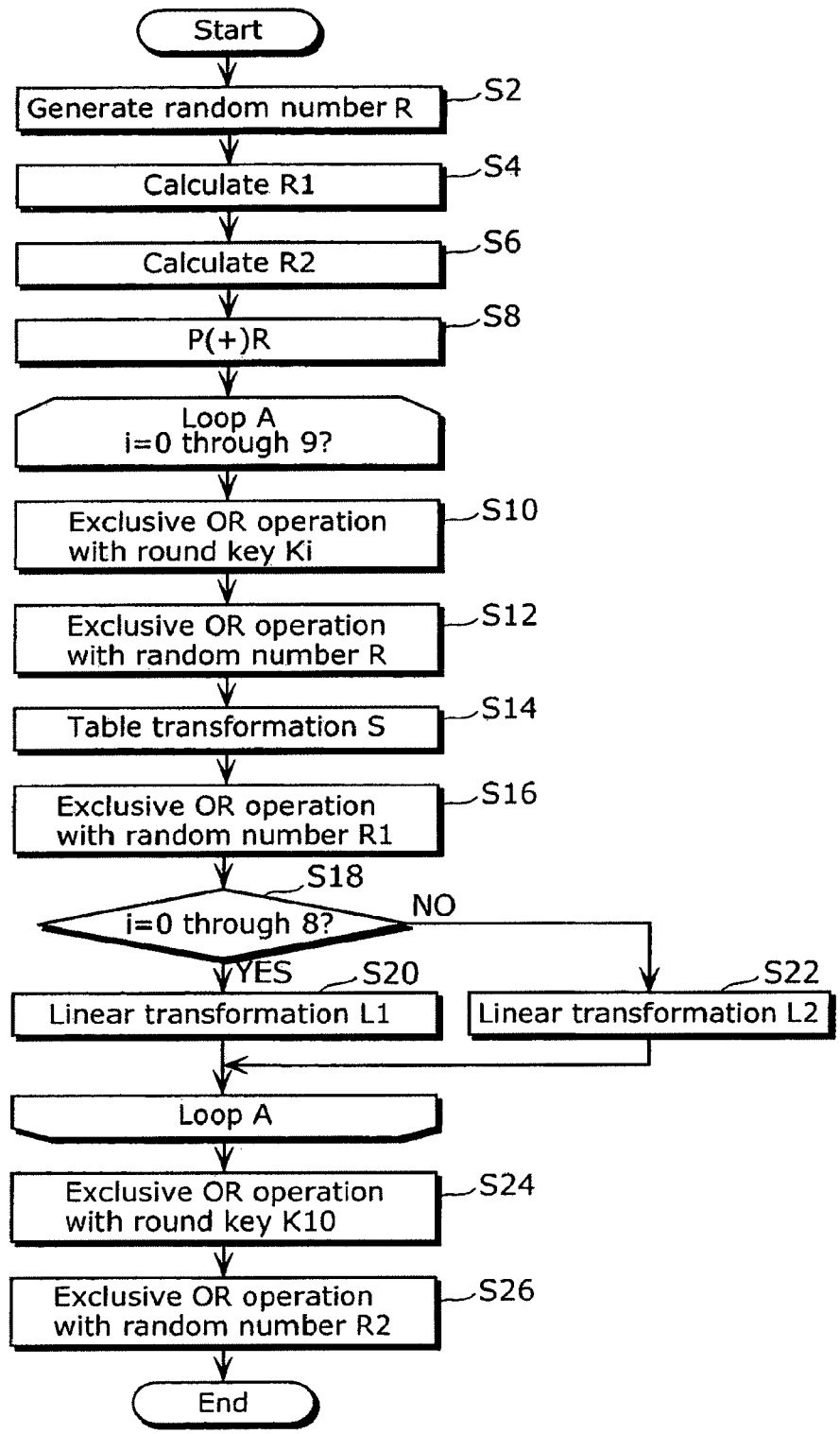
FIG. 9 is a flowchart which shows an AES encryption processing sequence.

FIG. 8 is a block diagram which describes the processing sequence in AES encryption for stopping power analysis attacks. FIG. 9 is a flowchart which shows the processing sequence for AES encryption. Below, the encryption processing sequence is described using FIG. 8 and FIG. 9. Note that the 11 piece 128-bit round keys K0, K1, ... K10 are already generated from a 128-bit encryption key.

(1) Generate a 128-bit random number R (S2). Find a value R1 which results from applying the inverse transformation L1i of the linear transformation L1 to the random number R (S4). Further, find a value R2 which results from applying the linear transformation L2 to R1. Here, the linear transformations L1 and L2 are the same processes as the L1 and L2 mentioned above.

(2) Perform an exclusive OR operation with the random number R on the 128-bit plain text P (40a, S8).

(3) Perform the following processes repeatedly (from (3-1) to (3-5)) in the sequence i=0, 1, ... 9 (loop A).

(3-1) Perform an exclusive OR operation with the round key Ki (40b, 41a, 42a, ... 49a, S10).

(3-2) Perform an exclusive OR operation with the random number R (40c, 41b, 42b, ... 49b, S12).

(3-3) Perform a table transformation S (40d, 41c, 42c ... 49c, S14). Here, the table transformation S is the same as the table transformation S already mentioned above.

(3-4) Perform an exclusive OR operation on the random number R1 (40e, 41d, 42d, ... 49d, S16)

(3-5) When i=0 through 8 (YES in S18), perform the linear transformation L1 (40f, 41e, 42e, ... 48e, S20). When i=9 (NO in S18), perform the linear transformation L2 (49e, S22).

(4) Perform an exclusive OR operation with the round key K10 (49g, S24).

(5) Perform an exclusive OR operation with R2 (49h, S26).

The result of performing the above processes (1) through (5) on the plain text P is outputted as the ciphertext C. Here, the processes (1), (2), (3-2) and (5) are processes that have been added from the original AES encryption process. Even when these processes are added, it is possible to obtain the same ciphertext as the ciphertext obtained in the original AES encryption process, as described below.

(A) The effect of the random number R, on which an exclusive OR operation is performed by the exclusive OR operation 40a with the plain text data P, is suppressed afterward by the exclusive OR operation 40c. In other words, the result value after the exclusive OR operation 40b is processed with the round key K0 is P(+)K0(+)R, and the result value after the exclusive OR operation 40c is P(+)K0(+)R(+)R=P(+)K0, cancelling out the effect of R.

(B) The effect of the random number R1 upon which an exclusive OR operation is performed by the exclusive OR operations 40e, 41d, 42d, ... 48d, which follow the table transformations 40d, 41c, 42c, ... 48c, are suppressed by the subsequent exclusive OR operations 41b, 42b, ... 49b which precede the table transformations 41c, 42c, ... 49c. For example, the intermediate value after the exclusive OR operation 40e is {intermediate value of the original AES encryption}(+)R1 and the input value of the exclusive OR operation 41b becomes {intermediate value of original AES encryption}(+)L1(R1). Here, L1(R1) indicates the result of the linear transformation L1 applied to R1, and since R1 itself is L1i(R), then L1(R1)=R. In other words, the input value of the exclusive OR operation 40e becomes {intermediate value of original AES encryption}(+)R, and the effect of R is suppressed in the exclusive OR operation 41b by performing an exclusive OR operation with R. The same is true for cases besides the example above.

(C) The effect of the random number R1, to which an exclusive OR operation is applied by the exclusive OR operation 49d after the table transformation 49c, is suppressed by the subsequent exclusive OR operation 49h. More specifically, the intermediate value during encryption, after the exclusive OR operation 49d, is {intermediate value of original AES encryption}(+)R1, and the value inputted into the exclusive OR operation 49h is {intermediate value of original AES encryption}(+)L2(R1). Thus, since L2(R1)=R2, the effect of the L2(R1) above is suppressed by the exclusive OR with R2 carried out by the exclusive OR operation 49h.

(Structure of the AES Encryption Device 410 for Stopping Power Analysis Attacks)

Figure 10:
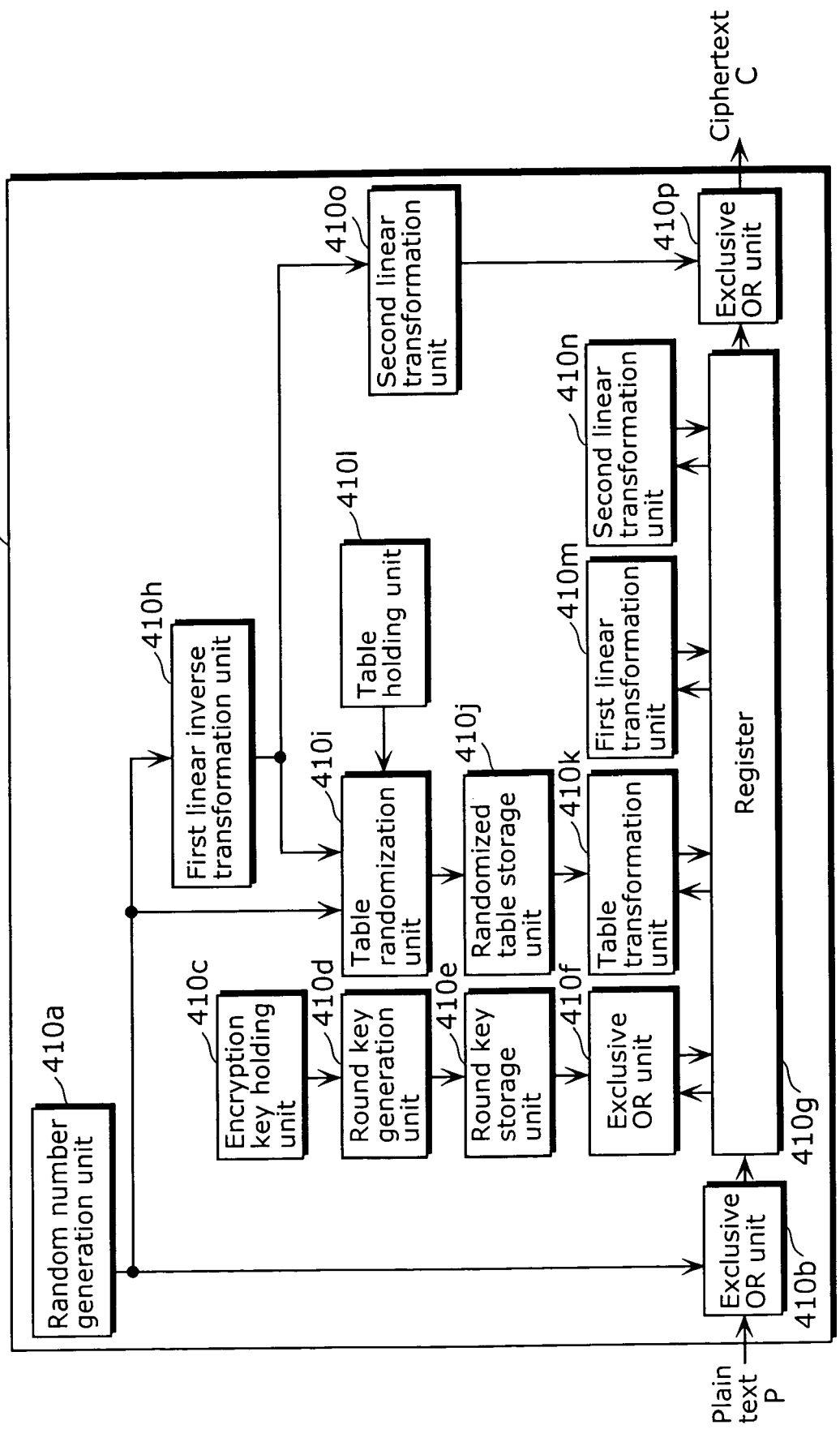
FIG. 10 is a block diagram which shows the structure of the encryption device 410 according to the embodiment of the present invention.

FIG. 10 is a block diagram which shows an example of the structure of the encryption device 410 which implements the AES encryption processing sequence in FIG. 8. Below, the processing sequence of the encryption device 410 is described with reference to the flowchart shown in FIG. 9.

The encryption key holding unit 410c holds a 128-bit encryption key. The round key generation unit 410d generates the 11 piece 128-bit round keys K0, K1, . . . K10 during encryption, based on the encryption key held in the encryption key holding unit 410c and according to the round key generation sequence in AES encryption. The round key storage unit 410e stores the round keys K0, K1, . . . K10.

Figure 11:
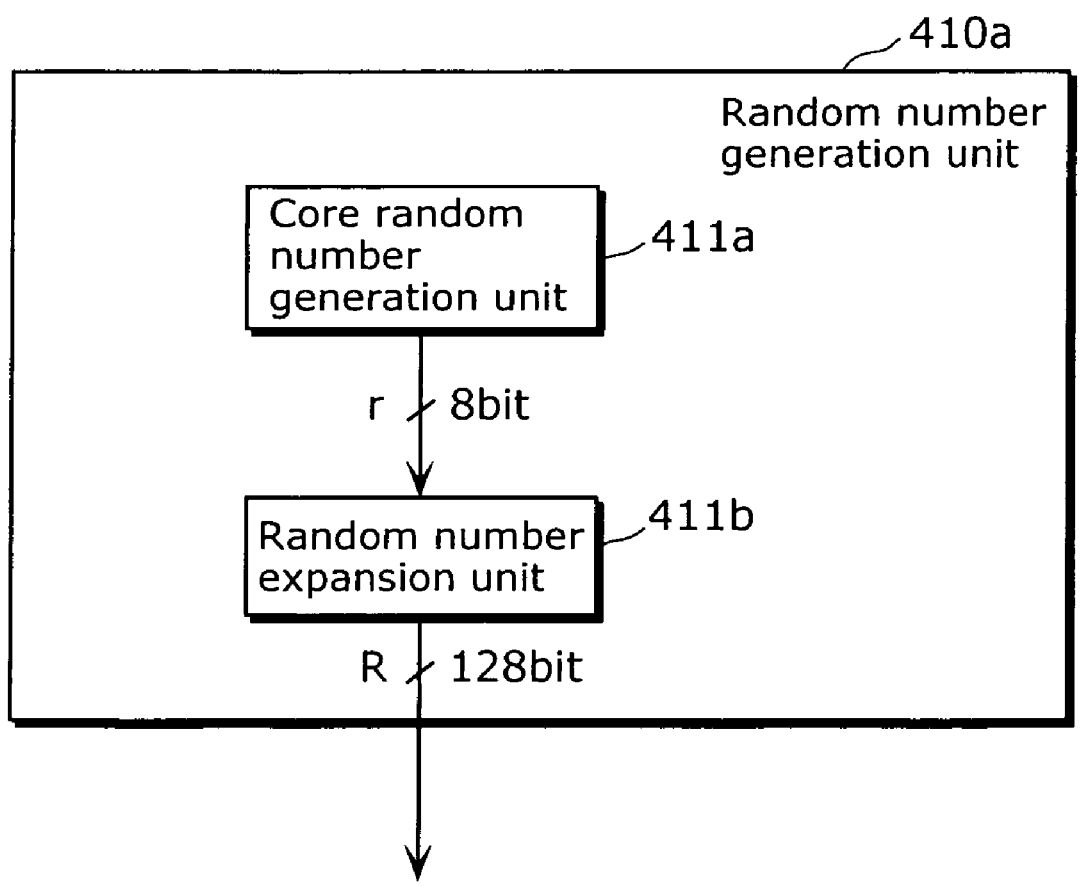
FIG. 11 is a block diagram which shows the structure of the random number generation unit 410a according to the embodiment of the present invention.

Next, the random number generation unit 410a generates the random number R (S2 in FIG. 9). The random number generation unit 410a is made up of a core random number generation unit 411a and a random number expansion unit 411b, as shown in FIG. 11. When generating the random number R, the core random number generation unit 411a first generates an 8-bit core random number r and transfers it to the random number expansion unit 411b. The random number expansion unit 411b treats the 16 concatenated random numbers r as the random number R and the random number generation unit 410a outputs this random number R. In other words, the random number R becomes R=r||r|| . . . ||r (with 16 r). Here, "||" stands for data concatenation. The 128-bit random number R that is generated is transferred to the exclusive OR unit 410b, the table randomizing unit 410i and the first linear inverse transformation unit 410h.

The first linear inverse transformation unit 410h applies an inverse transformation of the linear transformation L1 to the random number R, finds R1 (S4 in FIG. 9) and transfers R1 to the table randomizing unit 410i and the second linear transformation unit 410o. A detailed sequence of the first linear inverse transformation unit 410h is described as follows. First, the input data R is divided into 8-bit units from the most significant bit, a0, a1, a2, . . . a15. Next, with x0=a0, x1=a1, x2=a2 and x3=a3, $$\begin{pmatrix} Y0 \\ Y1 \\ Y2 \\ Y3 \end{pmatrix} = \begin{pmatrix} 0Eh & 0Bh & 0Dh & 09h \\ 09h & 0Eh & 0Bh & 0Dh \\ 0Dh & 09h & 0Eh & 0Bh \\ 0Bh & 0Dh & 09h & 0Eh \end{pmatrix} \times \begin{pmatrix} X0 \\ X1 \\ X2 \\ X3 \end{pmatrix} \quad \text{[Equation 2]}$$

the matrix algebra for the GF(2^8) shown in Equation 2 is performed and b0, b1, b2 and b3 are found. Where y0=b0, y1=b1, y2=b2 and y3=b3. In the same way, with x0=a4, x1=a5, x2=a6 and x3=a7, b0, b1, b2 and b3 are found by performing the matrix algebra resulting in y4=b0, y5=b1, y6=b2 and y7=b3. Further, with x0=a8, x1=a9, x2=a10 and x3=a11, then y8=b0, y9=b1, y10=b2 and y11=b3 are found, and with x0=a12, x1=a13, x2=a14 and x3=a15, then y12=b0, y13=b1, y14=b2 and y15=b3 are found. The y0, y1, . . . y15 found in this manner are the 128-bit data concatenated in the order: y0, y13, y10, y7, y4, y1, y14, y11, y8, y5, y2, y15, y12, y9, y6, y3 from the most significant bit; this data becomes the output of the first linear transformation unit 410h. Thus, when x0=x1=x2=x3=r in the above matrix algebra equation, y0, y1, y2 and y3 are calculated as below. Note that multiplication and addition are all operations included in GF(2^8).

$$y0 = y1 = y2 = y3 = 0Eh \times r + 0Bh \times r + 0Dh \times r + 09h \times r = 01h \times r = r$$

In the same way, since y4 to y15 are all displayed as equal to r, it is shown that the output R1 of the first linear inverse transformation unit 410h becomes R1=R=r||r|| . . . ||r. In other words, the first linear inverse transformation unit 410h does not actually have to perform any processing.

Figure 6:
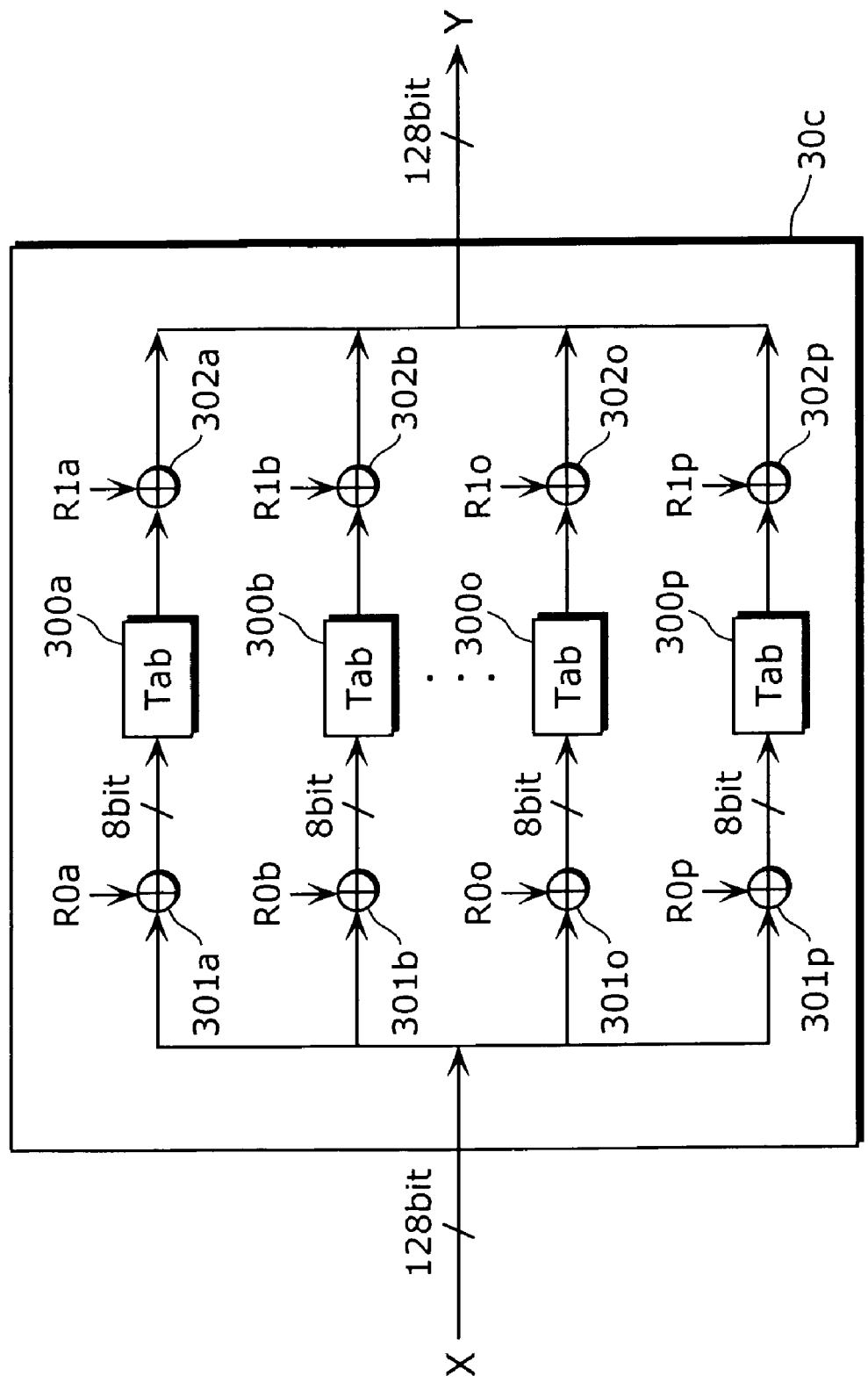
FIG. 6 is a block diagram which shows the structure of a table transformation process 30c according to the background art.
Figure 7:
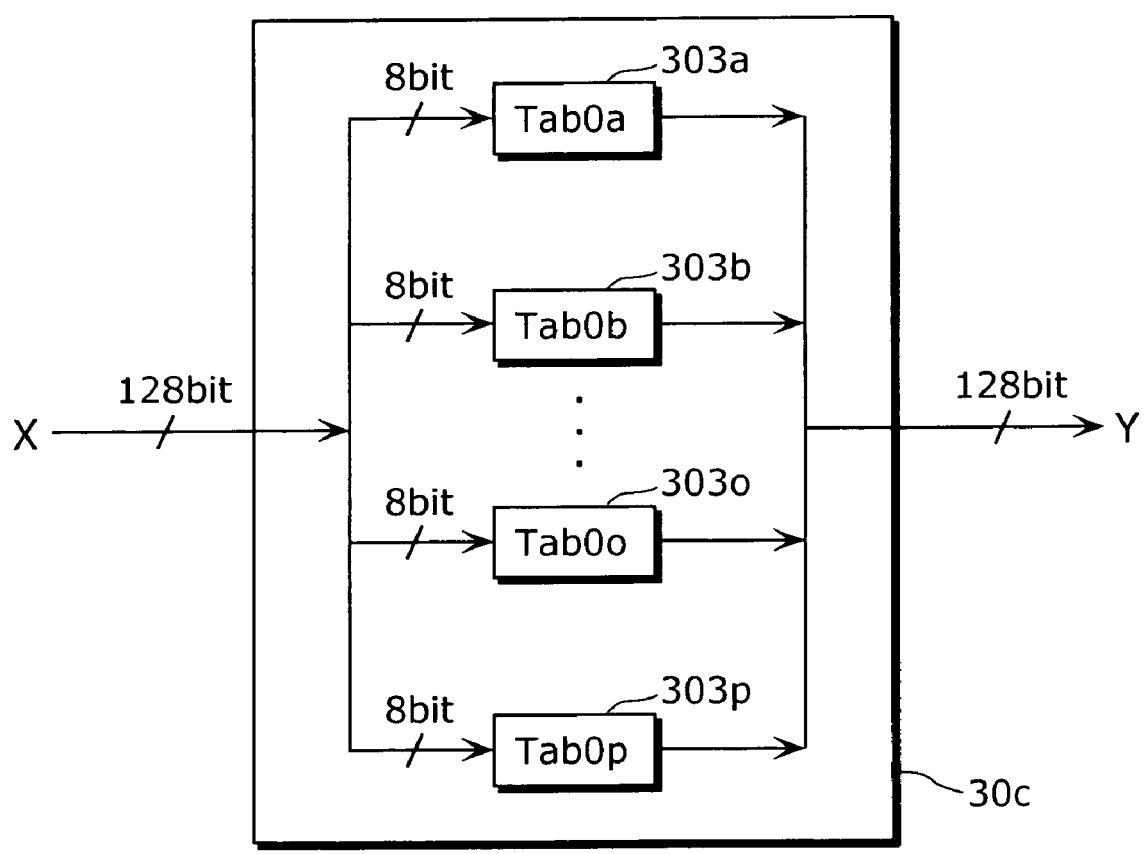
FIG. 7 is a block diagram which shows a transformation of the structure of the table transformation process 30c according to the background art.
Figure 12:
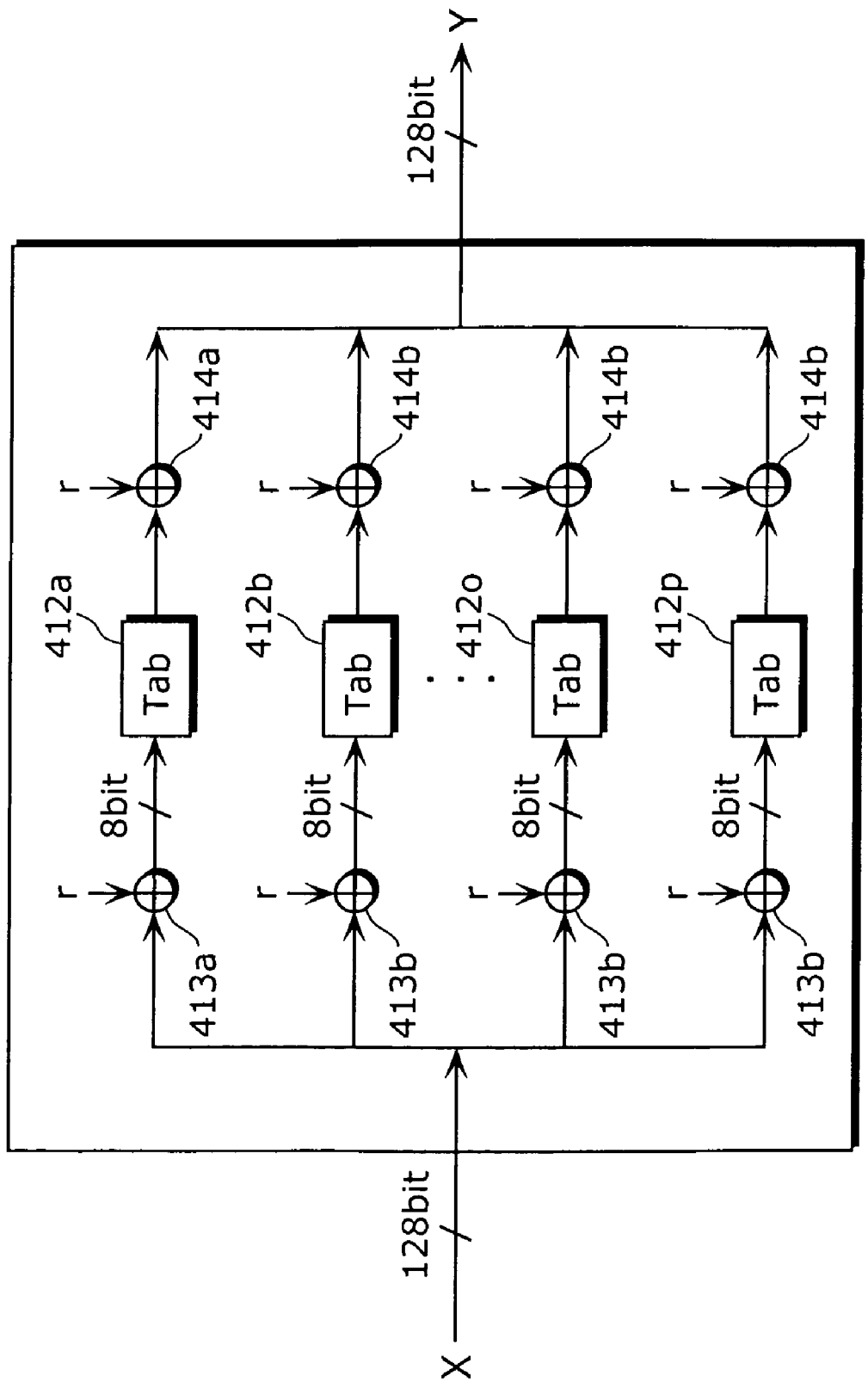
FIG. 12 is a block diagram which shows the structure of a random table transformation process according to the embodiment of the present invention.
Figure 13:
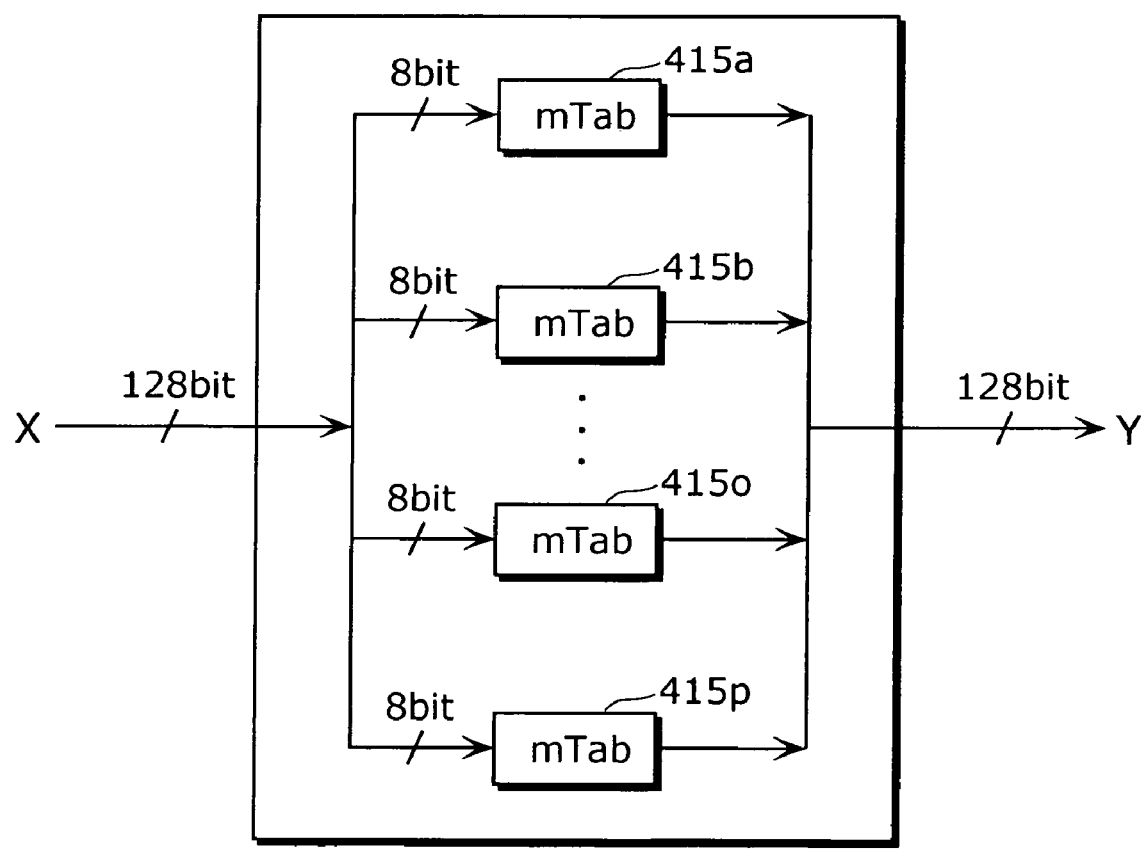
FIG. 13 is a block diagram which shows a first transformation of the random table transformation process according to the embodiment of the present invention.
Figure 14:
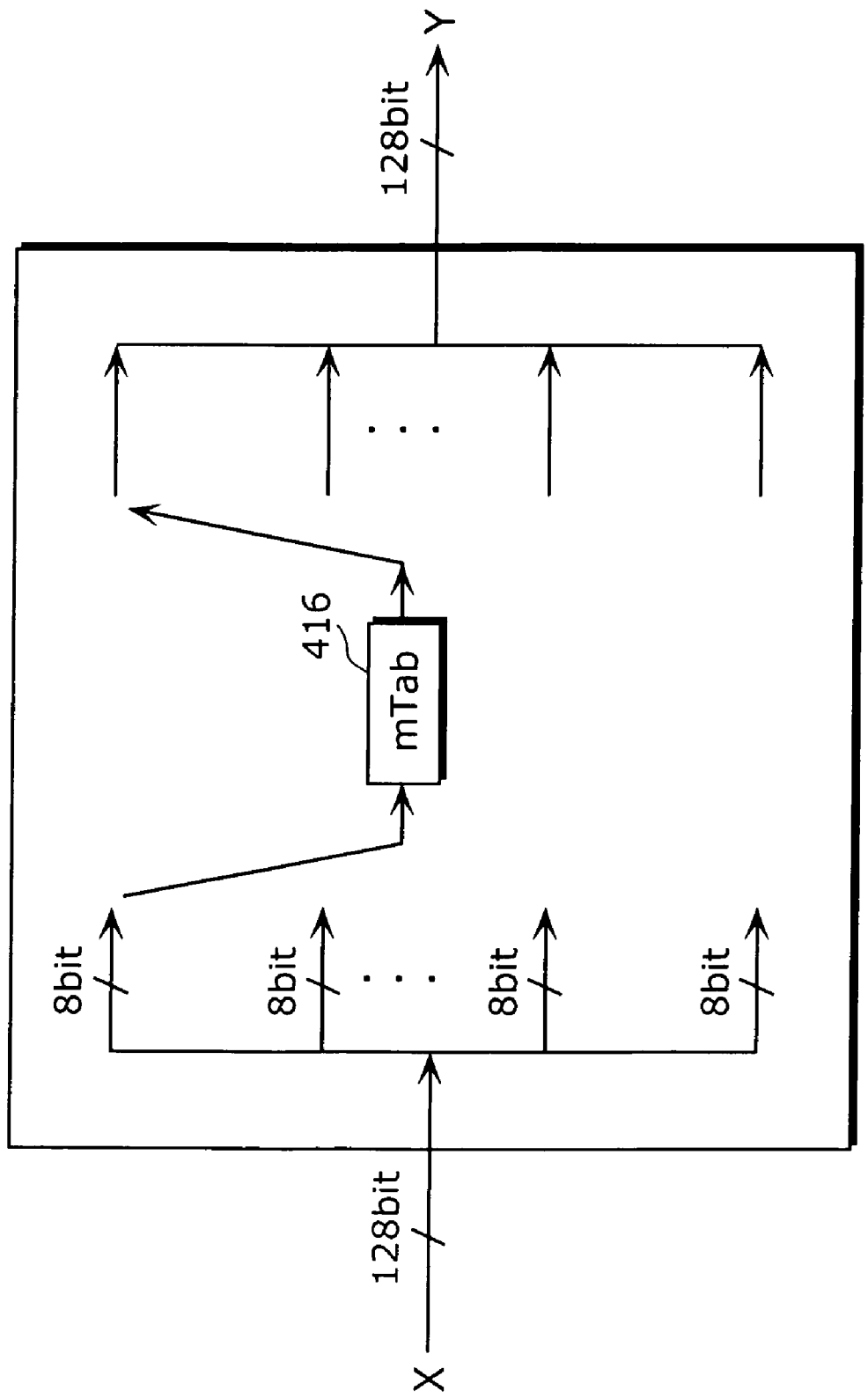
FIG. 14 is a block diagram which shows a second transformation of the random table transformation process according to the embodiment of the present invention.

Next, the table randomizing unit 410i randomizes the transformation table Tab in the original AES encryption, which is stored into the table holding unit 410l based on the random numbers R and R1. For the background art, as shown in FIG. 6, an exclusive OR operation on the various respective random numbers is performed before and after each table transformation process 300a through 300p. Thus, randomizing transformation tables 303a through 303p must be created respectively as shown in FIG. 7. However, in the present embodiment as shown above, the random numbers R and R1 are both R1=R=r||r|| . . . ||r. Thus, as shown in FIG. 12, exclusive OR operations are applied before and after each table transformation process 412a through 412p using the same random number r. Accordingly, all of this sequence of processes (exclusive OR with a random number⇒table transformation⇒exclusive OR with a random number) is transformed into the same randomizing transformation table mTab, as shown in FIG. 13. In other words, FIG. 13 can be achieved using one randomizing transformation table 416, as in FIG. 14. More specifically, the randomizing transformation table mTab is generated in the following way. First, the table randomizing unit 410i reads out the array data Tab[0] through Tab[255] in the transformation table Tab in the original AES encryption, which is held in the table holding unit 410l. Next, using the array data above and the core random numbers r included in the random number R as well as the random number R1, array data mTab[0] through mTab[255] are generated as follows.

$$m\text{Tab}[i]=\text{Tab}[i(+)r](+)r$$

The table randomizing unit 410i transfers and stores the above-generated randomizing transformation table mTab, in the randomizing table storage unit 410j.

Further, the second linear transformation unit 410o applies the linear transformation L2 to the random number R1, finding R2 and transferring R2 to the exclusive OR unit 410p (S6 in FIG. 9). Thus, the linear transformation L2 is a byte-wise replacement, as mentioned above, and since the random number R1 is R1=R=r||r|| . . . ||r (r is 8-bits) as described above, L2(R1)=R1=R. In other words, the second linear transformation unit 410o does not actually have to perform any processing.

The above is a process for performing encryption, and below, a sequence for performing an encryption process on the plain text P is described, based on the result of the above process.

The exclusive OR unit 410b performs an exclusive OR operation with the random number R on the plain text P, which is inputted into the encryption device 410, and the result of this exclusive OR operation is transferred to and temporarily stored in the register 410g (S8 in FIG. 9).

Next, the exclusive OR unit 410f reads out the data from the register 410g, performs an exclusive OR operation on the round key K0 stored in the round key storage unit 410e and writes the result into the register 410g (S10 in FIG. 9). Thus, before being written, the data stored in the register is overwritten and erased.

Next, the table transformation unit 410k reads out the data inside the register 410g and performs a table transformation process based on the randomizing transformation table mTab which is stored in the randomizing table storage unit 410j (S12 through S16 in FIG. 9). More specifically, when the data read out of the register 410g is X, the data Y after the table transformation process is found by Y=mTab[X]. The data after the transformation process is stored in the register 410g. The data within the register 410g, before the overwriting, is erased.

Next, the first linear transformation unit 410m reads out the data from the register 410g, applies the linear transformation L1 and overwrites the data into the register 410g (YES in S18, S20 in FIG. 9).

After the above processes, the exclusive OR unit 410f, the table transformation unit 410k and a process series in the first linear transformation unit 410m above are performed repetitively using the round keys K1, K2, K3, ... K9 (Loop A in FIG. 9). Note however, that when performing the process series above using the round key K9, the linear transformation L2 is performed by the second linear transformation unit 410n instead of the first linear transformation unit 410m (NO in S18, S22 in FIG. 9).

Further, the exclusive OR unit 410f reads out the data from the register 410g, performs an exclusive OR operation on the round key K10 stored in the round key storage unit 410e and writes the result into the register 410g (S24 in FIG. 9).

Subsequently, the exclusive OR unit 410p reads out the data stored in the register 410g, performs an exclusive OR operation on the random number R2 and outputs the result from the encryption device 410 as the ciphertext C (S26 in FIG. 9).

(Outline of the AES Decryption Processing Sequence)

Below, a processing sequence is described for decrypting the ciphertext C created in the AES encryption process, which stops the power analysis attacks described above.

Figure 15:
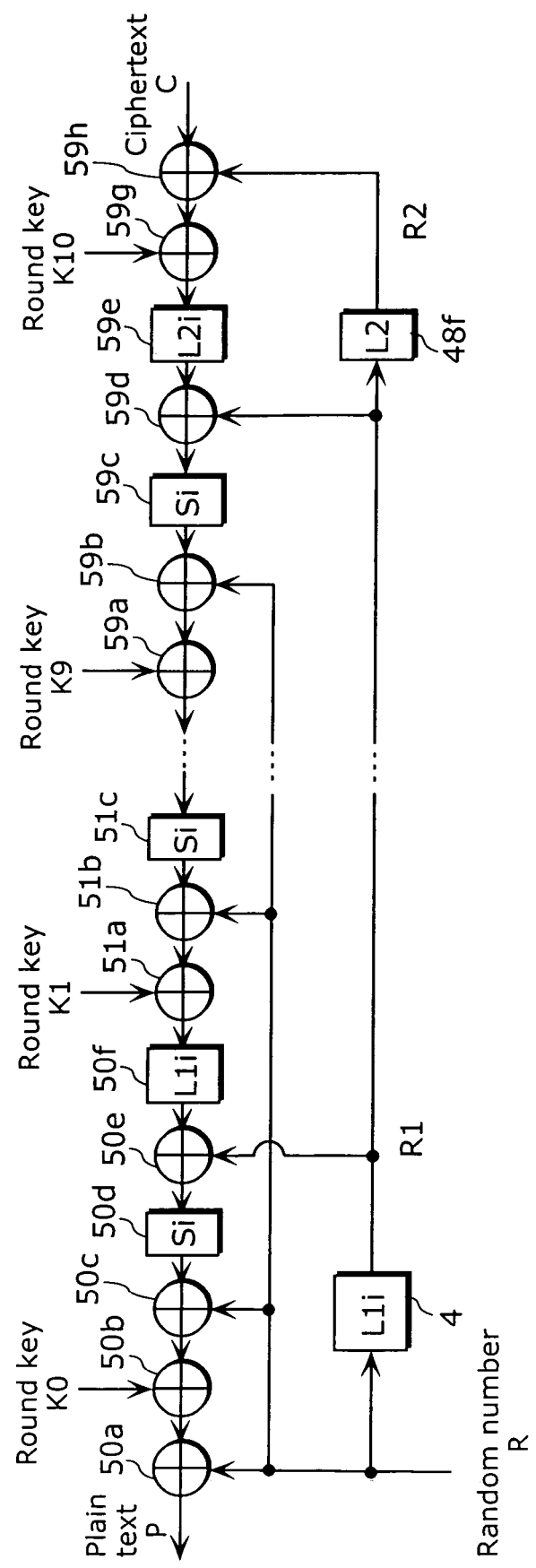
FIG. 15 is a block diagram which describes the processing sequence for AES decryption.

FIG. 15 is a block diagram which describes the processing sequence in AES decryption. The decryption process differs from the encryption processing sequence shown in FIG. 8 in that the data flow is reversed in order to generate the plain text P from the ciphertext C.

Also, the decryption processing sequence differs in that an inverse transformation Si of the table transformation S is applied to the data instead of the table transformation S, an inverse transformation L1i of the linear transformation L1 is applied to the data instead of the linear transformation L1, and an inverse transformation L2i of the linear transformation L2 is applied instead of the linear transformation L2. Note however that the linear transformation L2 (48f) is the same as before.

(Structure of the Decryption Device 510)

FIG. 16 is a block diagram which shows the structure of the decryption device 510 for decrypting the ciphertext C, which is encrypted by the encryption device 410, in order to find the plain text P. Here, only the differences from the encryption device 410 are described.

The inverse table holding unit 510l holds the inverse transformation table ITab, which is in an inverse transform relationship to the transformation table Tab held in the table holding unit 410l. More specifically, the array elements ITab[0] through ITab[255] are defined as below.

$$ITab[Tab[i]] = i (i = 0, 1, \ldots 255)$$

For the inverse table randomizing unit 510i, the method for finding a randomized inverse transformation table ImTab using the inverse transformation table ITab is the same as the method described for the table randomizing unit 410i, and is therefore not repeated.

In the decryption process performed by the decryption device 510, the exclusive OR unit 510p process is performed first. This is the same process as that of the exclusive OR unit 410p. Next, the exclusive OR unit 510f performs an exclusive OR operation using the round key K10 in the same way as the exclusive OR unit 410f. Subsequently, a process series consisting of the first linear inverse transformation unit 510m, the inverse table transformation unit 510k and the exclusive OR unit 510f respectively is repeated using each round key K9, K8, ... K1, K0. Thus, in the process series performed using the round key K9, processing is performed by the second linear transformation unit 510n instead of the first linear inverse transformation unit 510m. Thus, the first linear inverse transformation unit 510m performs the inverse transformation process L1i of the linear transformation L1 mentioned above, and the second linear inverse transformation unit 510n performs the inverse transformation process L2i of the linear transformation L2. After the above processes, the exclusive OR unit 510b performs an exclusive OR operation and outputs the result as the plain text P.

As mentioned above, in the present embodiment, only one randomizing transformation table made up of 256 8-bit array elements need be created and stored. In the background art, since it is necessary to create 160 randomizing transformation tables, which are made up of 256 8-bit array elements, the amount of processes for creating the randomizing transformation tables is diminished by $1/160^{th}$ compared to the background art.

Note that in the present embodiment, the encryption targeted by the power analysis attack is AES encryption, however power analysis attacks are not limited to AES encryption and can be applied with a similar method to any encryption scheme that uses a repetition model consisting of a process series that merges a round key and data, performs table transformation and linear transformation. Camellia encryption and Hierocrypt encryption are examples of such an encryption scheme.

In the present embodiment, the exclusive OR operation is used as a method for merging two pieces of data, however arithmetic addition may also be used for merging two pieces of data.

In the present embodiment, the first linear transformation unit 410m and the second linear transformation unit 410n do not actually need to perform any processes and therefore may be omitted.

Note that the present invention has been described based on the above embodiment, however the present invention is of course not limited to the above embodiment. A case like the following is included in the present invention.

(1) Each of the above devices is a computer system composed of, specifically, a microprocessor, ROM, RAM, a hard disk unit, a display unit, a keyboard, a mouse and so on. A computer program is stored in the RAM or in the hard disk unit. Each device carries out its function by the microprocessor operating according to the computer program. Here, the computer program is written with plural command codes incorporated, which indicate an instruction to the computer to carry out a predetermined function.

(2) Some or all of the constituent elements of each of the above devices may be made up of a single system Large Scale Integration (LSI) chip. System LSI is a super-multifunction LSI in which plural constituent units are integrated onto a single chip and manufactured; more specifically, system LSI is a computer system configured so as to include a microprocessor, ROM, RAM and so on. A computer program is stored in the RAM. The functions of the system LSI are achieved by the microprocessor operating according to the computer program.

(3) Some or all of the constituent elements that comprise each of the devices above may be composed from an IC card that is detachable from each device, or a simple module. The IC card or the module is a computer system composed of a microprocessor, ROM, RAM and so on. The IC card or the module may include the above super super-function LSI. The functions of the IC card or the module are achieved by the microprocessor operating according to the computer program. The IC card or the module may be tamper proofed.

(4) The present invention may be realized as the method shown above. Also, these methods may be realized as a computer program implemented by a computer or as a digital signal consisting of the computer program.

Also, the present invention may be realized as a recording media capable of being read by a computer, in which the computer program or the digital signal are recorded, such as a flexible disc, a hard disk, a CD-ROM, an MO, a DVD, a DVD-ROM, DVD-RAM, a BD (Blu-ray Disc), a semi-conductor memory and the like. Also, the present invention may be a digital signal recorded onto these recording media.

Also, the present invention may be realized as a device that transmits data through an electrical communications circuit, a wireless or wired communications circuit, a network which represents an internet, a data broadcast and so on.

Also, the present invention may be a computer system that includes a microprocessor and a memory, the memory storing the computer program above and the microprocessor operating according to the computer program.

Also, the present invention may be implemented by another independent computer system by storing the program or the digital signal, then transferring the program or the digital signal to a recording media, or by transferring the program or the digital signal through a network and so on.

(5) The above embodiment and the above modifications may be incorporated into each other.

INDUSTRIAL APPLICABILITY

The encryption device according to the present invention stops power analysis attacks and is characterized by reducing the processing load for the encryption process, therefore, the present invention can be applied to an encryption device and the like for which high-speed processing or low-cost implementation is in demand.

The invention claimed is:

1. A data encryption device which performs a predetermined encryption, based on a key, on a plain text and generates a ciphertext, said data encryption device comprising:
a random number generation unit operable to generate a single first core random number, and to generate a first random number by concatenating a predetermined number of repetitions of the single first core random number;
a plain text data-merging unit operable to perform an exclusive OR operation on the plain text and the first random number, and to generate intermediate data; and
a data randomizing unit operable to perform a data randomizing process on the intermediate data for each round of the encryption, the data randomizing process being based on the first random number, a second random number which is a concatenation of repetitions of a second core random number, and the key,
wherein said data randomizing unit includes:
a transformation table storage unit operable to store only a single transformation table for transforming a number of data pieces for each round of the encryption, the number of the data pieces for each round of the encryption being equal to the predetermined number;
a table modification unit operable to generate a single modified transformation table for each round of the encryption such that (i) an exclusive OR of input data to the single modified transformation table and the single first core random number is equal to the input data to the single transformation table and (ii) output data from the single modified transformation table is equal to an exclusive OR of output data from the single transformation table and the second core random number;
a modified transformation table storage unit operable to store only the single modified transformation table; and
a data transformation unit operable to perform a data transformation process,
wherein the intermediate data for each round of the encryption is divided into a number of pieces equal to the predetermined number, and the data transformation process is performed on each of the number of pieces of the intermediate data for each round of the encryption based on the key and the single modified transformation table stored in said modified transformation table storage unit.

2. The data encryption device according to claim 1, further comprising a random number transformation unit operable to perform a predetermined random number transformation on the first random number and to generate the second random number.

3. The data encryption device according to claim 2,
wherein said data randomizing unit further includes a linear transformation unit operable to perform a predetermined linear transformation on the intermediate data and output the result, and
wherein said random number transformation unit is further operable to perform an inverse transformation of the predetermined linear transformation as the random number transformation.

4. The data encryption device according to claim 3,
wherein the predetermined encryption is the AES (Advanced Encryption Standard) encryption process,
wherein said linear transformation unit is configured with an InvMixColumn process and an InvShiftRow process for AES encryption processing, and
wherein said random number transformation unit is further operable to output the first random number as the second random number.

5. An integrated circuit which performs a predetermined encryption, based on a key, on a plain text and generates a ciphertext, said integrated circuit comprising:
a random number generation unit operable to generate a single first core random number, and to generate a first random number by concatenating a predetermined number of repetitions of the single first core random number;
a plain text data-merging unit operable to perform an exclusive OR operation on the plain text and the first random number, and to generate intermediate data; and
a data randomizing unit operable to perform a data randomizing process on the intermediate data for each round of the encryption, the data randomizing process being based on the first random number, a second random number which is a concatenation of repetitions of a second core random number, and the key,
wherein said data randomizing unit includes:
a transformation table storage unit operable to store only a single transformation table for transforming a number of data pieces for each round of the encryption, the number of the data pieces for each round of the encryption being equal to the predetermined number;
a table modification unit operable to generate a single modified transformation table for each round of the encryption such that (i) an exclusive OR of input data to the single modified transformation table and the single first core random number is equal to the input data to the single transformation table and (ii) output data from the single modified transformation table is equal to an exclusive OR of output data from the single transformation table and the second core random number;

a modified transformation table storage unit operable to store only the single modified transformation table; and a data transformation unit operable to perform a data transformation process, wherein the intermediate data for each round of the encryption is divided into a number of pieces equal to the predetermined number, and the data transformation process is performed on each of the number of pieces of the intermediate data for each round of the encryption based on the key and the single modified transformation table stored in said modified transformation table storage unit.

6. A data encryption method for performing a predetermined encryption, based on a key, on a plain text and generating a ciphertext, said data encryption method comprising:

generating, using a processor, (i) a single first core random number and (ii) a first random number by concatenating a predetermined number of repetitions of the single first core random number;

performing an exclusive OR operation on the plain text and the first random number, and generating intermediate data; and performing a data randomizing process on the intermediate data for each round of the encryption, the data randomizing process being based on the first random number, a second random number which is a concatenation of repetitions of a second core random number, and the key, wherein said performing of a data randomizing process includes:

storing a single transformation table for transforming a number of data pieces for each round of the encryption, the number of data pieces for each round of the encryption being equal to the predetermined number;

generating a single modified transformation table for each round of the encryption such that (i) an exclusive OR of input data to the single modified transformation table and the single first core random number is equal to input data to the single transformation table and (ii) output data from the single modified transformation table is equal to an exclusive OR of output data from the single transformation table and the second core random number;

storing the single modified transformation table; and performing a data transformation process, wherein the intermediate data for each round of the encryption is divided into a number of pieces equal to the predetermined number, and the data transformation process is performed on each of the number of pieces of the intermediate data for each round of the encryption based on the key and the single modified transformation table.

7. A program embodied on a non-transitory computer readable storage medium for performing a predetermined encryption, based on a key, on a plain text and generating a ciphertext, wherein when executed, said program causes a computer to execute a method comprising:

generating (i) a single first core random number and (ii) a first random number by concatenating a predetermined number of repetitions of the single first core random number;

performing an exclusive OR operation on the plain text and the first random number and generating intermediate data; and performing a data randomizing process on the intermediate data for each round of the encryption, the data randomizing process being based on the first random number, a second random number which is a concatenation of repetitions of a second core random number, and the key, wherein said performing of a data randomizing process includes:

storing a single transformation table for transforming a number of data pieces for each round of the encryption, the number of data pieces for each round of the encryption being equal to the predetermined number;

generating a single modified transformation table for each round of the encryption such that (i) an exclusive OR of input data to the single modified transformation table and the single first core random number is equal to input data to the single transformation table and (ii) output data from the single modified transformation table is equal to an exclusive OR of output data from the single transformation table and the second core random number;

storing the single modified transformation table; and performing a data transformation process, wherein the intermediate data for each round of the encryption is divided into a number of pieces equal to the predetermined number, and the data transformation process is performed on each of the number of pieces of the intermediate data for each round of the encryption based on the key and the single modified transformation table.

* * * * *